US009516400B1

(12) United States Patent
Roberts et al.

(10) Patent No.: US 9,516,400 B1
(45) Date of Patent: Dec. 6, 2016

(54) BOOM STAND STACKING COUNTERWEIGHTS

(71) Applicants: Jeffrey A. Roberts, Apple Valley, MN (US); David M. Roberts, Saint Paul, MN (US)

(72) Inventors: Jeffrey A. Roberts, Apple Valley, MN (US); David M. Roberts, Saint Paul, MN (US)

( * ) Notice: Subject to any disclaimer, the term of this patent is extended or adjusted under 35 U.S.C. 154(b) by 0 days.

(21) Appl. No.: 14/930,545

(22) Filed: Nov. 2, 2015

Related U.S. Application Data

(63) Continuation-in-part of application No. 14/472,964, filed on Aug. 29, 2014, now abandoned.

(60) Provisional application No. 61/871,388, filed on Aug. 29, 2013.

(51) Int. Cl.
*F16M 11/18* (2006.01)
*H04R 1/08* (2006.01)
*F16M 11/10* (2006.01)

(52) U.S. Cl.
CPC ............... *H04R 1/08* (2013.01); *F16M 11/10* (2013.01); *F16M 11/18* (2013.01)

(58) Field of Classification Search
CPC .... F16M 11/048; F16M 11/2014; F16M 11/12; F16M 11/10; F16M 11/04; F16M 11/26; F16M 11/18; F16M 11/242; F16M 11/28; F16M 11/42; F16M 11/20; A47B 19/002; H04R 1/083; H04R 1/08
USPC ............ 248/121, 122.1, 123.2, 224.7, 125.2, 248/188.4, 217.4, 354.3, 514, 519; 285/144.1, 285/148.1, 330, 289.3, 222.2, 285/222.3, 49; 403/1, 403/180, 182, 183, 403/184, 185, 181, 192, 299
See application file for complete search history.

(56) References Cited

U.S. PATENT DOCUMENTS

| 275,050 | A | * | 4/1883 | Keller | ................ | E21B 17/023 |
| | | | | | | 279/97 |
| 964,353 | A | * | 7/1910 | Whittier | ............... | F16L 13/126 |
| | | | | | | 279/99 |
| 1,610,414 | A | * | 12/1926 | Bernard | ................ | E21B 17/06 |
| | | | | | | 285/330 |
| 1,625,266 | A | * | 4/1927 | Mast | ...................... | H01R 4/66 |
| | | | | | | 279/93 |
| 1,663,356 | A | * | 3/1928 | Smith | ..................... | A47H 1/02 |
| | | | | | | 403/184 |
| 1,942,925 | A | * | 1/1934 | Jenkins | .................... | H04R 1/08 |
| | | | | | | 248/123.2 |
| 2,083,091 | A | * | 6/1937 | Rector | ................. | F16L 15/008 |
| | | | | | | 285/355 |
| 2,479,720 | A | * | 8/1949 | Brandt | ................... | G03B 15/07 |
| | | | | | | 248/123.2 |

(Continued)

*Primary Examiner* — Jonathan Liu
*Assistant Examiner* — Muhammad Ijaz
(74) *Attorney, Agent, or Firm* — Albert W. Watkins

(57) ABSTRACT

A boom stand adapted to support an electroacoustic device is constructed from a base, pivotal boom, stand elevating the pivotal boom, and a stacking counterweight. The stacking counterweight includes a terminal weight having a generally cylindrical body longitudinally terminated with a threaded coupler adapted to operatively couple with a threaded coupler on the boom, while aligning the terminal weight longitudinally co-axially with the boom. One or more medial weights having a generally cylindrical body and appropriate threaded couplers can be inserted between the boom and terminal weight. Each of the medial and terminal weights are preferably shaped to be adequately grasped by a person's palm and finger portion of a hand clasping about the longitudinal axis, and are thereby adapted to operatively permit manual rotation about their longitudinal axes.

6 Claims, 4 Drawing Sheets

(56) References Cited

U.S. PATENT DOCUMENTS

| | | | | |
|---|---|---|---|---|
| 2,760,744 A * | 8/1956 | Watrous | | F21V 21/06 248/123.2 |
| 3,074,748 A * | 1/1963 | Ulrich | | F16L 15/008 285/212 |
| 5,112,046 A * | 5/1992 | Thorpe | | A63D 15/08 473/47 |
| 2004/0135040 A1* | 7/2004 | Eason | | F16M 11/048 248/122.1 |
| 2005/0161561 A1* | 7/2005 | Hsieh | | F16B 7/1463 248/171 |
| 2006/0120550 A1* | 6/2006 | McCann | | H04R 1/08 381/363 |
| 2008/0253601 A1* | 10/2008 | Hilderman | | H04R 1/026 381/363 |
| 2008/0303275 A1* | 12/2008 | Johnson | | E21B 17/042 285/334 |
| 2011/0167986 A1* | 7/2011 | Hennessey | | G10D 13/06 84/453 |
| 2014/0232104 A1* | 8/2014 | Bernardi | | F16L 25/023 285/48 |
| 2015/0102187 A1* | 4/2015 | Hennessey et al. | | F16M 11/10 248/122.1 |
| 2015/0365752 A1* | 12/2015 | Mcintosh | | H04R 3/04 381/122 |
| 2016/0053934 A1* | 2/2016 | Hennessey | | F16M 11/28 248/124.2 |

* cited by examiner

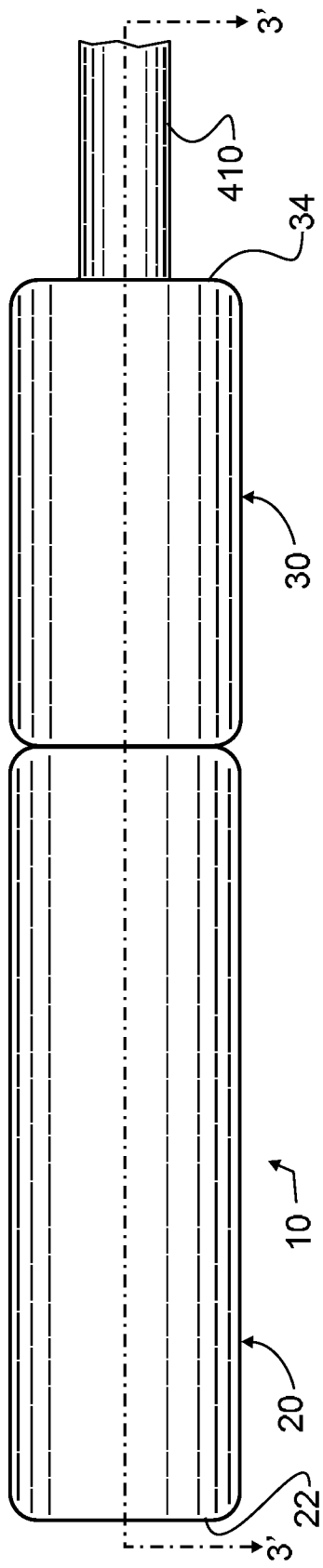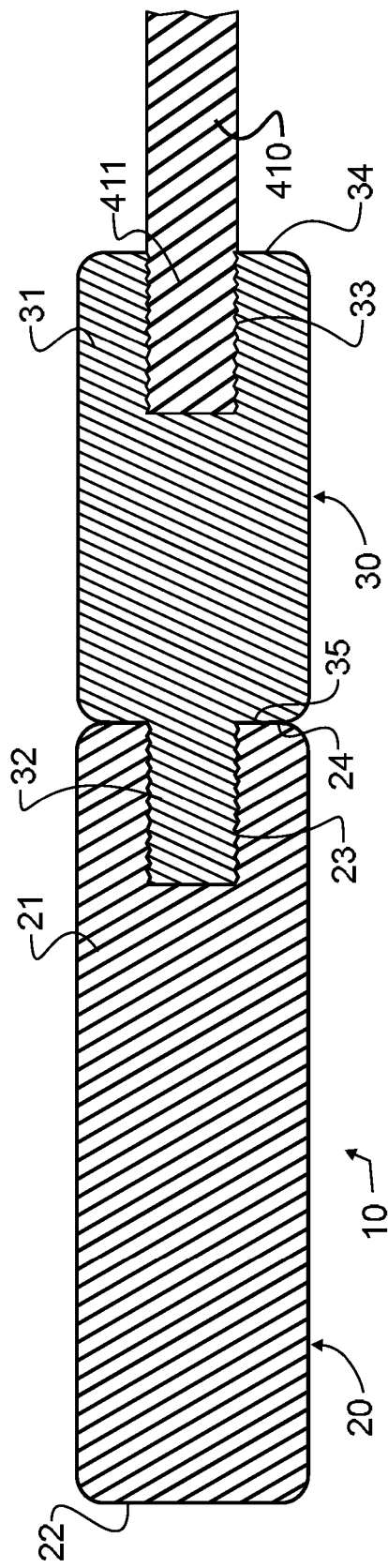

BOOM STAND STACKING COUNTERWEIGHTS

CROSS REFERENCE TO RELATED APPLICATIONS

This application is a Continuation-In-Part of U.S. patent application Ser. No. 14/472,964 filed Aug. 29, 2014 and co-pending herewith, which in turn claims the benefit under 35 U.S.C. 119(e) of U.S. provisional patent application Ser. No. 61/871,388 filed Aug. 29, 2013, both of like title, the contents of each which are incorporated herein by reference in entirety.

BACKGROUND OF THE INVENTION

1. Field of the Invention

This invention pertains generally to electrical audio signal processing systems and devices, and more particularly to electro-acoustic audio transducers such as housed microphones that are supported upon a boom stand and counterbalanced by stable and acoustically neutral counterweights. In a most preferred manifestation, the present invention relates to acoustically inactive counterweights that are readily manually attached and detached from booms on an electro-acoustic microphone stand.

2. Description of the Related Art

In many settings such as but not limited to broadcast or live musical performances, electro-acoustic microphones and other apparatus are often attached to an at least partially horizontally extending arm, referred to as a boom, that is supported by a vertical support or stand. Most commonly, the item to be supported will preferably be easily relocated, as will the stand or at least the boom. This ability to provide a relatively adjustable and easily relocated support is in great demand. Frequently, a plurality of these boom stands will be required, such as, for exemplary purposes but not limited thereto, in the case of a musical or theatrical performance where different performers or different parts of a stage are preferred to be either illuminated or coupled into an audio system.

Depending upon the particular item to be supported, the boom stand may have several requirements which must be met to perform satisfactorily. Among these, one common requirement is the ability for a person to readily and rapidly reposition the boom, and then subsequent to the repositioning, anchor the boom into a new fixed position. This ability to readily and rapidly reposition the boom permits the stand to be placed at a convenient location along the ground or floor, without great care in the precise positioning. Once the base is located, then the boom arm may be moved into proper alignment.

While the application for the boom stand will to some degree potentially affect the various dimensions and some of the configurations not only of the base, but of the stand as well, including such things as particular lengths or dimensions of the base and the boom, most desirably a boom stand will offer substantial flexibility in both application and physical arrangement and positioning. This flexibility is a desirable part of the benefits of such a stand, which is in part what separates such a stand from a fixture or anchored support.

Since the boom may extend some distance from the base, it is generally desirable to incorporate significant mass into the base, to provide some measure of stability during movement or adjustment of the boom and subsequent thereto to best maintain the location of the boom. Unfortunately, in the prior art this often led to the use of a large and very massive base, typically of disc, slightly domed, or similar shape. Such a base is not readily transported, nor can it be used or stored in close arrangement with other bases. Consequently, it is not possible to tightly and compactly arrange, use or store a plurality of similar stands.

To provide more compact storage and lighter weights, a number of designers have resorted to tripod stands. By providing a plurality of longer legs, the legs may be manufactured in much lower weight or mass, while still providing good stability against tipping. Unfortunately, these stands also have drawbacks. First and foremost, the tripod legs, to avoid the need for substantial mass, must be relatively long. Long legs in turn form a serious hazard for anyone passing near to the boom stand. In the event a boom stand is accidentally knocked over, the item supported thereon may be destroyed. In the case of the performing arts, the microphones that are supported thereon may cost thousands of dollars to replace. Furthermore, the disruption to a performance when a stand is accidentally toppled is highly undesirable.

Consequently, there are trade-offs that have been required with many of the prior art boom stands in either portability or stability that are undesirable. Either the stand is light and unstable, light and in the way and prone to being accidentally toppled, or heavy and difficult to handle, move about, and store.

Even where the vertical support is stable enough to support an unbalanced device some horizontal distance from the vertical support, another challenge arises in the coupling between boom and vertical support. In many of the prior art stands the connection between the boom and the vertical support can weaken or slip, causing the boom to lower on the side with the device. This sagging leads to undesirable movement away from the musician or instrument, which can lead to complete loss of adequate signal coming from this microphone or to a loss of selectivity of sound being received by the microphone.

This sagging arises due to an inadequate coupling between boom and stand. Heretofore in the prior art, one such coupling was a simple connection using a screw or the like to urge two flat surfaces together, or using the screw in a manner similar to a set screw to bite into an opposed surface. Two exemplary patents, the teachings and contents which are incorporated herein by reference, are U.S. Pat. No. 5,154,381 by Malinao, entitled "Microphone boom holder", which illustrates a prior art weak pivot, with a fixed counterweight; and U.S. Pat. No. 5,739,447 by Hoshino, entitled "Attachment and detachment of a weight to a boom cymbal stand", which illustrates a thumb screw to prevent rotation of boom, a tripod stand for portability, and a manually attached and detached fixed weight.

This type of connection has almost no resistance to pivotal forces at the end of the boom, since the measure of forces upon an arm are calculated by not only the force applied, but also by the distance from the point of rotation. Consequently, when even a small force is applied at a great distance such as at or near the end of a boom arm, the force is magnified by the multiple of relative distance from pivot. Said another way, a first force applied at ten times the distance from a pivot as a second point would require ten times the first force to be applied in an opposite direction at the second point to cancel the first force. In the case of a small flat, knuckle, or set screw located at or adjacent to the pivot, such as found in the Malinao patent, this knuckle may be hundreds or even thousands of times closer to the pivot than the end of the boom, and consequently require hundreds or thousands of times the force to prevent rotation about the pivotal axis. The end result of this inadequate coupling between boom and stand is movement of the boom, which may in turn lead to the device being located in a position not balanced directly over the vertical support, and therefore require all too frequent manual readjustment and alignment. Additionally, this imbalance provides a certain amount of risk of tipping the vertical support, which can lead to destruction of sensitive microphones, as well as harm or damage to surrounding equipment and people.

As a result, and as is known in the industry, even minor forces of only a few pounds at the end of the boom overcome the resistance at the knuckle, since these few pounds require thousands of pounds of force at the knuckle to stop such rotation. The few pounds of force cause the boom to realign undesirably. One way to overcome this deficiency of the prior art couplings between boom and stand is to provide a higher-quality coupling, such as illustrated by the present inventor in U.S. Pat. Nos. 7,207,532; 7,635,109; and 7,819,367; the contents and teachings of each which are incorporated herein by reference. These patents illustrate a particularly stable stand that can support very large loads from the end of the boom, without any sagging and with an improved massive base that enables relatively larger off-balance loads to be safely supported by the stand.

However, there are many stands that have already been produced and placed into service that do not have the features found in the stands designed in accord with the present inventor's patents. Another way to at least in part overcome the weak holding force found in many of the prior art couplings is to provide a more precise counterweight on an end of the boom arm opposite to the microphone or other device. If the counterweight creates an equal and opposite torque to that created by the microphone, then there is no net rotary force applied to the boom. This means that there is no tendency for the boom to rotate, meaning that more modest prior art couplings can still support a microphone properly.

However, with this counterweight comes a new set of challenges. One of these is the way the counterweight is attached to the stand. Most commonly, this is accomplished with a set screw or the like, which permits a fixed weight to be slid along the portion of the boom on the opposite side of the stand connection, distal from the microphone end. The weight can then be moved to compensate for heavier and lighter microphones or other devices. Furthermore, if the boom is adjusted to extend farther from the stand on the microphone side, the weight may also be moved to again zero the rotary forces about the coupling between boom and stand. Since the weight is intended to slide along the boom, and since the boom will generally not be a perfect cylinder, there must also be some space or gap between the inside bore of the weight and the outside diameter of the boom to accommodate these variances. This also means that the weight cannot fit tightly onto the boom, except for by the use of a set screw. Over time, the set screw will damage the boom, and will also tend to loosen, just as the coupling between boom and stand tends to loosen. As a result, this type of weight loses efficacy, and may also damage or destroy the boom. If the set screw loosens, there will be a great propensity for acoustic vibration, which can destroy the function of the microphone and stand. Because of the limited engaging surfaces, which comprise the tip of the set screw and a small line of contact directly opposite of the set screw tip, there may also be a tendency in some stands to develop destructive acoustic vibrations even when the set screw is secured. Furthermore, a wrench is required to tighten or loosen the set screw, which must occur before adjusting the position of the counterweight. As a result, these types of weights are normally affixed once and often never adjusted again.

Other artisans have coupled weights using other techniques. In the Hoshino patent incorporated by reference herein above, a static weight is provided that quickly attaches and detaches to provide counterbalance for a cymbal. Undesirably, this weight is relatively complex, thereby requiring greater cost and incorporating a greater chance of failure or undesirable resonances, and still provides only for a boom with or without the single weight. Another exemplary patent, the teachings and contents which are incorporated herein by reference, is U.S. Pat. No. 5,611,508 by Palmero, entitled "Horizontally adjustable microphone support". This patent describes a threaded-on counterweight that is adjustable by how far onto the threaded rod the weight is rotated. However, there is nothing to load or lock the threads, meaning the device will tend to spin about the threads, and self-adjust. In addition, since there is no solid connection between the weight and the boom, the connection there between will be prone to vibrating undesirably.

Beyond the music industry, booms or similar apparatus are known that extend horizontally. However, these booms have very different requirements and objectives than those required for an electroacoustic device. Because of the lack of concern about acoustic energy or acoustic coupling, most of these devices use weights that are free to rattle about. An exemplary patent, the teachings and contents which are incorporated herein by reference, is U.S. Pat. No. 3,028,133 by Craig, entitled "Baby bottle holder". This patent describes a set of screw-on counterweights. These weights screw over a threaded shaft, but the weights are free to vibrate against each other and the shaft, making this apparatus completely unacceptable for use with an electroacoustic device.

Others use cables and other apparatus that can also resonate or vibrate. An exemplary patent, the teachings and contents which are incorporated herein by reference, is U.S. Pat. No. 3,783,262 by Pile, entitled "Portable surgical lamp". This patent describes a cable-connected counterweight as a part of an undesirably large and exposed apparatus. The cable will create an undesirable resonance at a frequency determined by the cable length and tension, will be awkward to transport, and may be dangerous if accidentally snagged and swung about.

Others have structures that are known exactly, such as for lights and the like, and these apparatus also control the movement to keep the counterweight and fixture balanced. An exemplary patent, the teachings and contents which are incorporated herein by reference, is U.S. Pat. No. 3,789,213 by Sonneman, entitled "Counterbalanced lamp". This patent describes a fixed counterweight, made possible by the known fixed weight of the light fixture and the novel pivoting structure that keeps the weight and light fixture balanced for zero net torque. Other similar exemplary patents, the teachings and contents which are incorporated herein by reference, are U.S. Pat. No. 3,994,464 by Perbal et al, entitled "Internally wired counter-balanced bracket"; U.S. Pat. No. 4,364,535 by Itoh et al, entitled "Counterbalance mechanism for laser knife device"; U.S. Pat. No. 4,782,428 by Lowell et al, entitled "Collapsible fluorescent light for photography"; and U.S. Pat. No. 3,790,773 by Sapper, entitled "Lamp with an articulated support".

Yet others use basic fastener attached counterweights that require a pair of tools to secure, release, or adjust the weights. One exemplary patent, the teachings and contents which are incorporated herein by reference, is U.S. Pat. No.

3,486,514 by Prescott, entitled "Canopy support". This patent describes an umbrella support using a set of counterweights held onto a shaft by a pair of nuts surrounding the weights. Another exemplary patent, the teachings and contents which are incorporated herein by reference, is U.S. Pat. No. 5,126,928 by Hughes, entitled "Mobile boom-mounted shop light". This patent describes a counterweight using set-screw attached collars to capture the weights.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is, in combination, a boom stand and an electroacoustic device supported therefrom. A boom defines a longitudinal axis and is terminated adjacent a first longitudinal end with an electroacoustic device coupler and at a second end with a first threaded coupler. A stand elevates the boom. A terminal weight has a generally cylindrical body defining a longitudinal axis. The terminal weight generally cylindrical body is shaped to be adequately grasped by a person's palm and finger portion of a hand clasping about the terminal weight longitudinal axis and thereby adapted to operatively permit manual rotation of the terminal weight generally cylindrical body about the terminal weight longitudinal axis. The terminal weight is longitudinally terminated with a second threaded coupler adapted to operatively couple with the first threaded coupler while aligning the terminal weight longitudinal axis co-axially with the boom longitudinal axis. At least one medial weight has a generally cylindrical body defining a longitudinal axis. The at least one medial weight is shaped to be adequately grasped by a person's palm and finger portion of a hand clasping about the medial weight longitudinal axis, and is thereby adapted to operatively permit manual rotation of the medial weight generally cylindrical body about the medial weight longitudinal axis. The at least one medial weight is longitudinally terminated with a third threaded coupler adapted to operatively couple with the first coupler while aligning the medial weight longitudinal axis co-axially with the boom longitudinal axis. The at least one medial weight is further longitudinally terminated distally from the third threaded coupler with a fourth threaded coupler adapted to operatively couple with the second threaded coupler while aligning the medial weight longitudinal axis co-axially with the terminal weight longitudinal axis.

In a second manifestation, the invention is a boom stand adapted to operatively support an electroacoustic device. A boom defines a longitudinal axis and is terminated adjacent a first longitudinal end with an electroacoustic device coupler and at a second end with a first threaded coupler. A stand elevates the boom. A terminal weight has a generally cylindrical body defining a longitudinal axis. The terminal weight generally cylindrical body is shaped to be adequately grasped by a person's palm and finger portion of a hand clasping about the terminal weight longitudinal axis and thereby adapted to operatively permit manual rotation of the terminal weight generally cylindrical body about the terminal weight longitudinal axis. The terminal weight is longitudinally terminated with a second threaded coupler adapted to operatively couple with the first threaded coupler while aligning the terminal weight longitudinal axis co-axially with the boom longitudinal axis. At least one medial weight has a generally cylindrical body defining a longitudinal axis. The at least one medial weight is shaped to be adequately grasped by a person's palm and finger portion of a hand clasping about the medial weight longitudinal axis, and is thereby adapted to operatively permit manual rotation of the medial weight generally cylindrical body about the medial weight longitudinal axis. The at least one medial weight is longitudinally terminated with a third threaded coupler adapted to operatively couple with the first coupler while aligning the medial weight longitudinal axis co-axially with the boom longitudinal axis. The at least one medial weight is further longitudinally terminated distally from the third threaded coupler with a fourth threaded coupler adapted to operatively couple with the second threaded coupler while aligning the medial weight longitudinal axis co-axially with the terminal weight longitudinal axis.

OBJECTS OF THE INVENTION

Exemplary embodiments of the present invention solve inadequacies of the prior art by providing a stacking counterweight that can be easily manually attached and detached in stages to provide a variable amount of weight adjacent to a boom end. The individual weights preferably have a large grasping surface area so as to enable nearly all persons to manually grasp and rotate with sufficient force to secure them to the boom and to other weights without the need for tools.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

It is the principal object of the present invention to stabilize a boom, both to aid in the prevention of tipping a vertical support and to aid in the prevention of the boom sagging if the connection between boom and vertical support weakens or loosens, by providing a counterweight that creates an equal and opposite torque to that created by a microphone or other device supported by the boom. An additional object of the present invention is to provide this stability through a counterweight that is quickly and easily customizable, intuitive, and relatively compact. A further object of the present invention is to provide a variable counterweight that can be easily manually attached and detached in stages to provide a variable amount of weight adjacent to a boom end. Another object of the present invention is to provide a large grasping surface area so as to enable nearly all persons to manually grasp and rotate individual weights with sufficient force to secure them to the boom and to other weights, without tools and still avoiding the risk of extraneous rattle or vibration that might interfere with the operation of an electroacoustic device. Yet another object of the invention is to provide a way to manually stack counterweights together in a manner that is free of acoustic vibration, secure, and which permits manual separation even after exposure to acoustic and other vibrations at any angle of orientation of the boom.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 2 illustrates the preferred embodiment stacking counterweight of FIG. 1 having in combination one each of the two preferred embodiment weights affixed to each other and to the boom end from a side perspective view, though it will be understood that the top and bottom plan views may be identical thereto.

FIG. 3 illustrates the preferred embodiment stacking counterweight coupled with the boom end as illustrated in FIG. 2, from a sectional view taken along a vertical plane illustrated by section line 3' of FIG. 2.

DESCRIPTION OF THE PREFERRED EMBODIMENT

Figure 1:
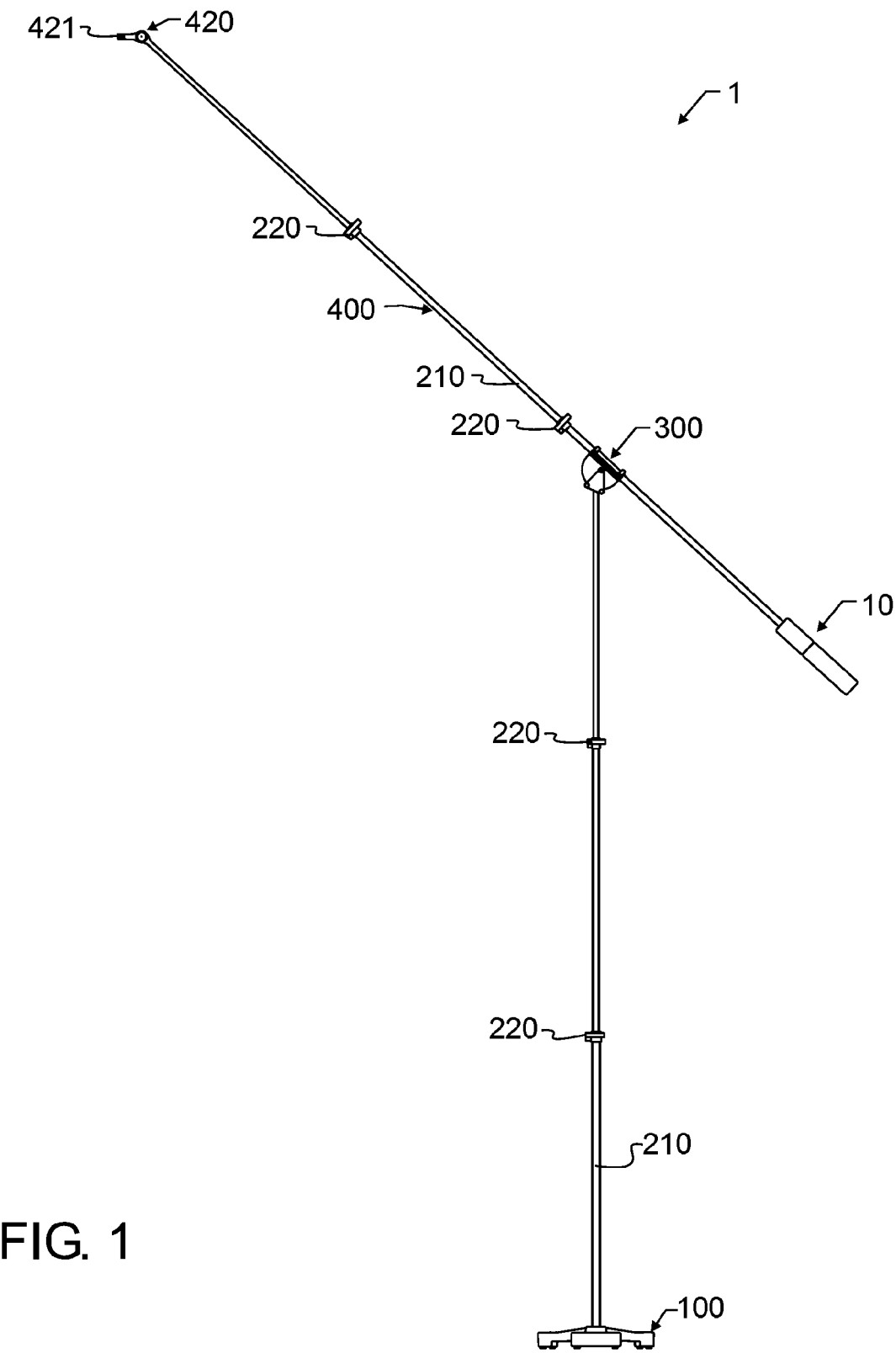
FIG. 1 illustrates a preferred embodiment boom stand that is suitable for supporting an electroacoustic device and that is designed in accord with the teachings of the present invention, with the boom in one optional position, from a side plan view.

Manifested in the preferred embodiment, the present invention provides a boom stand 1 which is adapted to support one or more of a variety of known devices thereon, including but not solely limited to an electroacoustic device such as a microphone. More specifically, but not limited thereto, microphones, cameras, lights, medical equipment, and many other devices may be supported therefrom. For reasons to be explained herein below, the support of sensitive electrical or electronic equipment is most preferred, especially pertaining to microphones, but the application of the present invention is not solely limited thereto and is instead contemplated by the present inventor to have other applications as well.

Boom stand 1 includes a base 100 which is designed to support boom stand 1 upon a floor or other surface. Most preferably, though not an absolute requisite, the floor or other surface will be relatively planar or flat, at least in the region adjacent to base 100. This permits base 100 to be formed with points of contact all in a planar relationship, thereby removing any need for special supporting contact points or leveling feet or the like. Arising from base 100 is a stand 200, which in the preferred embodiment boom stand 1 is an extension stand comprising several telescoping segments such as segment 210 separated and locked into place by locking members 220. At the top of stand 200 distal to base 100 is a pivoting boom support clamp 300, carrying thereon a boom 400. Boom 400, like stand 200, may in the preferred embodiment include a plurality of telescoping tubular sections such as section 210 interconnected and held in relative placement by additional locking members 220. At the end of boom 400 closest to the load to be supported, a separate pivotal joint 420 may be provided with a stub or additional coupler 421. To this coupler 421 any of a wide variety of already known component supports may be attached, the details which are not critical to the proper operation of the present invention. Distal to coupler 421 is an adjustable counterweight 10 designed in accord with the teachings of the present invention, which is preferred to maintain balance across boom 400. Additional features and capabilities that may be incorporated within the present preferred embodiment boom stand 1 are illustrated and described in my patents incorporated by reference herein above.

Figure 4:
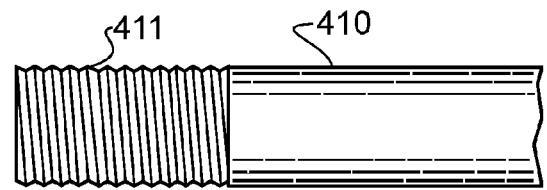
FIG. 4 illustrates a preferred embodiment boom end and threaded terminus of FIG. 1, but without the preferred embodiment stacking counterweight, from a side plan view.

In preferred embodiment boom stand 1, the end 410 of boom 400 distal to coupler 421 is provided with a threaded terminus 411 having male threading such as would be found on a machine bolt or pipe, such as illustrated in FIG. 4. This threading begins at the very end of boom 400 and continues up boom 400 for some length. Preferably the threading is relatively fine with many threads per inch, but other threading or other equivalent or suitable couplings are considered to be incorporated herein.

A stacking counterweight 10 is attached to threaded terminus 411 of a boom end 410. Stacking counterweight 10 is preferably provided with two weight geometries, a terminal weight 20 geometry and a medial weight 30 geometry such as illustrated in FIGS. 5 and 6.

Figure 6:
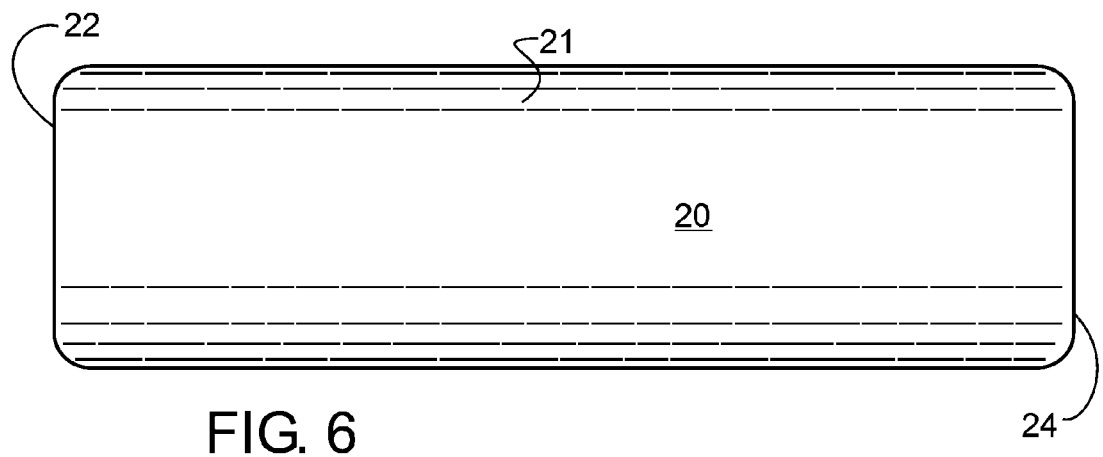
FIG. 6 illustrates a preferred embodiment terminal weight of FIG. 1 from a side plan view.

Preferred embodiment terminal weight 20 may be provided with a cylindrical body 21 with two ends, as illustrated in FIG. 6. Terminus 22, which will preferably define the most extreme extension of boom 400, may be generally flat as illustrated, but may be domed, rounded, fileted, or have any other suitable shape. Terminus 22 will be the most likely surface for contact with other objects or persons, and will preferably not have a sharp or abrupt edge such s would be found on a simple cut rod.

Coupler 23 of terminal weight 20 is distal to terminus 22, and is preferably provided with female threading to match male threading that may be provided on a compatible prior art boom stand. Terminal weight 20 may be of any prescribed size, material, or mass that is suitable to provide a counterbalance for a device affixed to coupler 421 on the distal end of boom 400. Terminal weight 20 may be screwed on to boom 400 directly, or to a medial weight 30 as illustrated in FIGS. 1-3.

Figure 5:
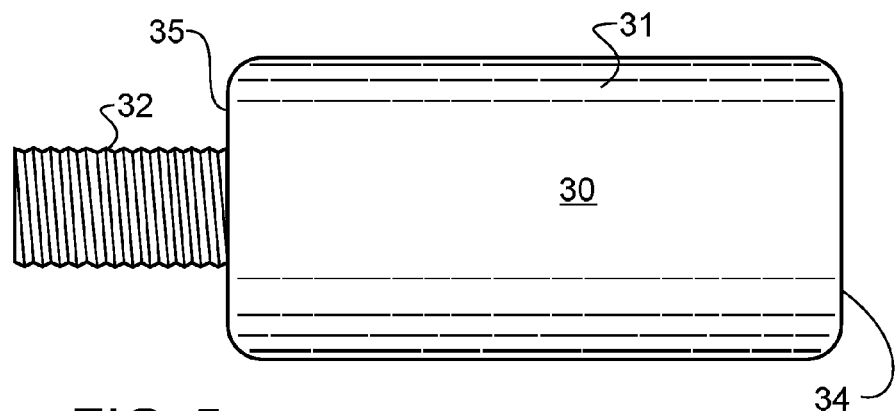
FIG. 5 illustrates a preferred embodiment medial weight of FIG. 1 from a side plan view.

A preferred embodiment medial weight 30 may be provided with a cylindrical body 31 with two ends, as illustrated in FIG. 5. One end is provided with a coupler 33 having female threading to match the male threading on threaded terminus 411 of a compatible boom stand, and the other end is provided with a male coupler 32 having male threading preferably identical to that of threaded terminus 411 found on boom 400.

By ensuring that male coupler 32 matches threaded terminus 411 on boom 400, female coupler 33 of medial weight 30 may then be coupled with threaded terminus 411 directly, or, alternatively, coupled to one or more additional medial weights 30 intervening there between. When so provided, any number of medial weights 30 may be affixed in a series, which allows a person to decide at the time of use how much mass is appropriate to counterbalance a coupler 421 and device attached thereto.

A medial weight 30 may end the series. However, a terminal weight 20 will preferably be affixed, as illustrated in FIGS. 1-3, to provide a more finished surface and appearance, and to prevent any debris from accumulating on male coupler 32 of the final medial weight 30 during use. Since terminal weight 20 will necessarily extend from the vertical support provided by stand 200, a finished surface will also help to reduce the likelihood of undesirable snagging of clothes or other objects that may accidentally brush up against the protruding end of male coupler 32.

Facing surface 24 engages with shoulder 35 during rotation of terminal weight 20 about the terminal weight longitudinal axis, thereby operatively tensioning the threads within threaded female coupler 23 and threaded male coupler 32 to ensure snug and vibration-free engagement therebetween. Similarly, the threads within threaded female coupler 33 and about threaded terminus 411 will also preferably be tensioned. In this case, a person may grasp boom end 410 while rotating medial weight 30, until the threads are tensioned, though without the benefit of a facing surface and shoulder, the torque applied may need to be greater at this coupling.

A benefit of boom stand stacking counterweight 10 designed in accord with the teachings of the present invention is that counterweight 10 provides a quick, easy, and customizable boom balance at the point of use. A user can affix a single terminal weight 20, any number of medial weights 30, or any combination of medial and terminal weights to reach a desired counterbalance mass, and yet the weights are relatively compact, facilitating both use and transport. The mass of counterweight 10 can provide stability to prevent tipping when a device affixed to boom 400 is far from the vertical support of a stand 200, and help prevent sagging of boom 400 when the connection between stand 200 and boom 400 is not fully secure.

Preferred embodiment terminal weights 20 and medial weights 30 are shown here as cylinders, but the shape of the weights may vary based on the desires of the user. Alternate forms may include spheres, figurines, or other shapes chosen or created in the design process. Furthermore, the outer cylindrical surface can be textured, knurled, or have one or any number of flats formed thereon. For the purposes of the present disclosure, the reference to a generally cylindrical body will be understood to include these variants, provided that the body is still shaped to adequately be grasped by a person's palm and finger portion of a hand. This is important to the present invention, since this provides a large manual contact surface, allowing the preferred embodiment stacking counterweight 10 to be manually installed by nearly any individual in a very secure manner free from resonance or chatter, and without the need for tools of any sort.

Additionally, the preferred embodiment boom stand stacking counterweight diameters are shown here to be equal, but the diameter may vary between weights, so long as the diameter is large enough to accommodate female threading of the appropriate size. The weights 20, 30 may be of any prescribed mass, and this mass may vary from weight to weight. The couplers illustrated herein comprise male threading on the boom and female threading for engaging therewith, but it will be understood herein that this arrangement can be reversed to provide the female threading on the boom and male threading on the terminal and medial weights for engagement therewith.

In consideration of the foregoing figures and description, several additional features and options are also considered and incorporated herein. Preferred embodiment boom stand stacking counterweights may be manufactured from a variety of materials, including metals, resins and plastics, ceramics or cementitious materials, or even combinations, laminates or composites of the above. The specific material used may vary, though special benefits are attainable if several important factors are taken into consideration.

Preferably, all materials are selected to be sufficiently tough and durable to not fracture, even when great forces are applied thereto such as might be applied during the accidental toppling of a boom stand. This can be challenging, since in normal use the counterweights are placed at the end 410 of an extended boom 400, meaning the counterweights might be required to absorb the entire energy of impact when a boom stand 1 does topple.

Furthermore, it is very preferable that the combination of geometry and materials do not lead to very undesirable resonances or echoes within the audible range of frequencies. Consequently, a substantially solid counterweight is generally preferable to a substantially hollow one.

The threaded or other equivalent couplings 23, 32, 33, 411 will most preferably be secured well to further prevent or minimize any differential vibration from occurring between two adjacent counterweights or a counterweight and boom 400. Such differential vibrations may, for exemplary purposes only and not limiting thereto, generate a buzzing sound that can be annoying and yet difficult to locate. The use of relatively high quality threading, such as the relatively fine threading mentioned above, will generally be adequate. Alternatively or additionally, the threads or other suitable coupling may be provided with a thread locking polymer, or with vibration dampening material within the threaded region either as an additional coating, layer or body, or even as the primary material of the stacking counterweight 10 or boom stand 1.

The materials used for preferred embodiment boom stand stacking counterweight 10 are also preferably relatively dense, which allows them to be more compact for a given weight. Many common metals are quite dense, particularly when compared to polymers used in the fabrication of plastic parts, and with or without additional coatings or finishes various metals and metal alloys will have characteristics suited to meet the other objectives.

The outer perimeter or external surface of the counterweights may also be provided with a suitable surface finish. In the preferred embodiment illustrated in the Figures, this surface comprises a black color, and may further comprise a surface texture such as a lightly knurled surface, a matte finish, or other finish such as will be desired by a particular designer for a particular application. As noted herein above, where a texture is provided, the preferred embodiment counterweights 20, 30 may more readily be manually attached and removed from each other and boom threaded terminus 411. The particular surface finish, including color and texture, will be chosen in accord with the teachings of the present invention by a designer for a particular look and application.

Figure 7:
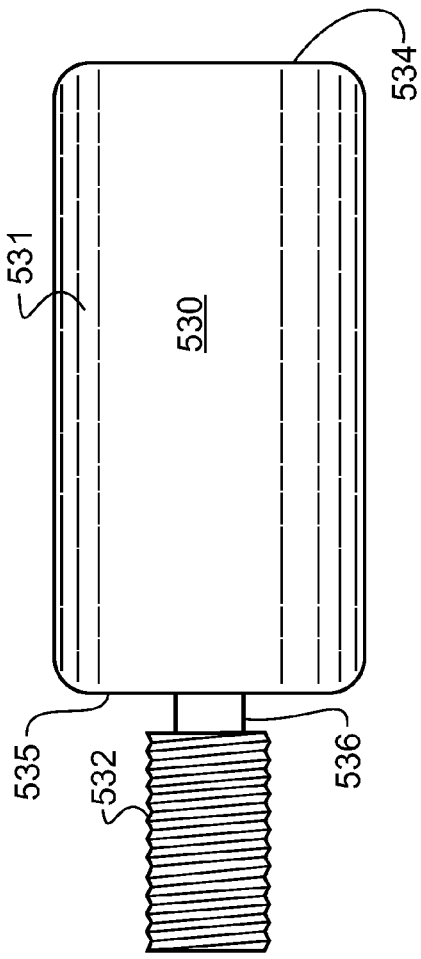
FIG. 7 illustrates a first alternative embodiment medial weight similar to the medial weight of FIG. 5 from a side plan view.
Figure 8:
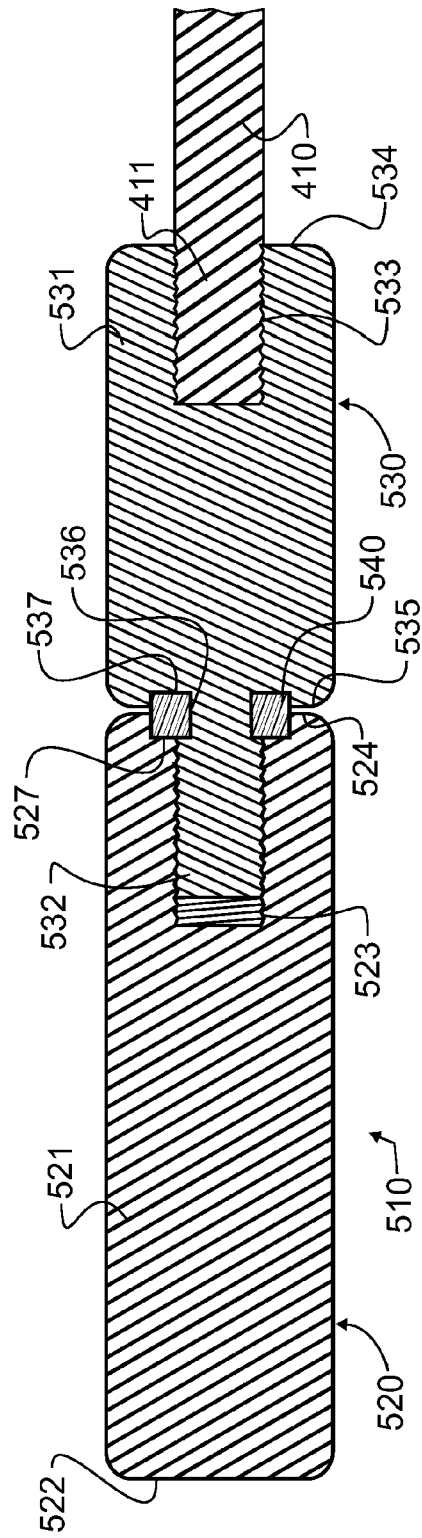
FIG. 8 illustrates a first alternative embodiment stacking counterweight using the medial weight of FIG. 7 and coupled with the boom end from a sectional view taken along a vertical plane similar to that illustrated in FIG. 3.

FIG. 7 illustrates a first alternative embodiment medial weight 530, and FIG. 8 illustrates a first alternative embodiment stacking counterweight 510 using the medial weight 530 of FIG. 7 and coupled with boom end 410. This first alternative embodiment stacking counterweight 510 is distinguished from the preferred embodiment stacking counterweight 10 by the hundreds digit, while individual components within each embodiment are designated by the ones and tens digits. Since many of the individual components are alike or similar between the preferred and alternative embodiments, numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

Terminal weight 520 has a body 521 with two ends. Terminus 522 defines the most extreme extension of boom 400, and may have geometry similar to terminus 22. Coupler 523 of terminal weight 520 is distal to terminus 522, and is preferably provided with female threading to match male threading that may be provided on a compatible prior art boom stand. However, facing surface 524 differs from facing surface 24 due to the provision of an annular depression 527 generally surrounding the opening to threaded female coupler 523.

Medial weight 530 may also have a body 531 with two ends, as illustrated in FIG. 7. One end, facing surface 534, is provided with a coupler 533 having female threading to match the male threading on threaded terminus 411 of a compatible boom stand, as visible in FIG. 8. The end distal to facing surface 534 is provided with a male coupler 532 having male threading preferably identical to that of threaded terminus 411 found on boom 400. However, rather than male coupler 532 coming directly out of body 531, a slightly narrower neck 536 is provided. Neck 536 provides a location which will preferably be configured to receive and retain an elastomeric washer 540. In other words, and as visible in FIG. 8, if the inside diameter of washer 540 is less than the outside diameter of male coupler 532, and if washer 540 is sufficiently elastomeric, then in order for washer 540 to be placed around neck 536, washer 540 must be stretched. This means that once washer 540 is stretched over male coupler 532, and then slid into abutment with body 531, the inside perimeter of washer 540 will contract around neck 536 and not be removable from medial weight 530 without again stretching washer 540.

In addition, shoulder 535 is also provided with an annular depression 537 adjacent to neck 536. As may be apparent from FIG. 8, most preferably under appropriate force for manual tightening, shoulder 535 will not come into contact with facing surface 524. Instead, the thickness of washer 540 will prevent such contact. In addition, washer 540 will ensure snug and vibration-free engagement there between. In the event a person excessively tightens terminal weight 520 onto medial weight 530, then washer 540 will be excessively compressed. Without the annular depressions 527, 537, excessive tightening may cause washer 540 to be crushed and literally extruded or driven out of the space between facing surface 524 and shoulder 535. However, in stacking counterweight 510, these annular depressions 527, 537 provide sufficient space for washer 540 to exist in compressed state, even if a person excessively tightens terminal weight 520 onto medial weight 530. In such a case, facing surface 524 will engage with shoulder 535, preventing any further tightening and also preventing damage to or destruction of washer 540.

This means that as soon as washer 540 is even slightly compressed between annular depressions 527, 537, washer 540 will help greatly to secure terminal weight 520 to terminal weight 530 by creating tension within the threaded couplings and also by the additional friction introduced. In addition, washer 540 may also help to reduce any differential vibration from occurring between two adjacent counterweights. One of the challenges with a threaded coupling is the uncertainty of the orientation of the boom stand, the uncertainty of the force applied to tighten the connection, and the acoustic and other vibratory energy that the stand may be exposed to. Each of these can lead to the threads undesirably locking together with force that is greater than can be manually overcome. By providing washer 540 intermediate to the adjacent counterweights, this undesirable locking can be eliminated.

While annular depressions 527, 537 are illustrated as having smooth surfaces, which will reduce wear over time when used with common elastomeric materials such as natural or synthetic rubber, there is no requirement that this be so. Similarly, while washer 540 is illustrated as having a geometry resembling that of an annular body or flat perforated disk, in alternative embodiments washer 540 may take any suitable shape, or may be comprised by a plurality of discrete elastomeric bodies.

Further, the outer diameter of annular depressions 527, 537 are illustrated in FIG. 8 as matching the outer diameter of washer 540. In some alternative embodiments contemplated herein, it may also be desirable to vary the outer diameter of annular depressions 527, 537 relative to the outer diameter of washer 540, such as by making the outer diameter of annular depressions 527, 537 slightly larger than the outer diameter of washer 540. In such case, when washer 540 is compressed, it may stretch slightly to fill the extra space created by the greater outer diameter of the annular depressions before engaging with the outer diameter of annular depressions 527, 537. Noteworthy here is that, once washer 540 engages with the outer diameter of annular depressions 527, 537, there will be more surface area in contact, and the rotary force required for further rotation will significantly increase. Consequently, this may be useful to provide tactile feedback to a person and thereby assist with proper tightening.

The outer diameter of annular depressions 527, 537 does not, in fact, have to be cylindrical, and may instead in an alternative embodiment have one or a plurality of flat surfaces formed therein, to instead resemble the counter-relief surface of a hex-sided nut, for exemplary and non-limiting purpose. In even further alternative embodiments contemplated herein, the outer diameter of annular depressions 527, 537 may be textured, or have ribs or other surface features. In these alternative embodiments having non-cylindrical outer peripheries, and in the event of tightening sufficient to significantly compress washer 540, then the outer diameter of washer 540 will interact with these surface features and thereby significantly increase the friction there between, consequently also significantly increasing the rotary force required for further tightening and again providing tactile feedback.

While throughout the foregoing description of first alternative embodiment stacking counterweight 510, two annular depressions 527, 537 are described, it will further be understood herein that a single annular depression may be formed in either facing surface 524 or shoulder 535 of depth equivalent or effective to operate similar to the combined depth of the two annular depressions 527, 537 as illustrated. Nevertheless, the use of two annular depressions 527, 537 as illustrated is preferred, since there is less chance of washer 540 being permanently damaged or deformed.

While the foregoing details what is felt to be the preferred and alternative embodiments of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. In combination, a boom stand and an electroacoustic device supported therefrom, comprising:
   a boom defining a longitudinal axis and terminated adjacent a first longitudinal end with an electroacoustic device coupler and at a second end with a first threaded coupler; a stand elevating said boom;
   a terminal weight having a generally cylindrical body defining a longitudinal axis, said terminal weight generally cylindrical body shaped to be adequately grasped by a person's palm and finger portion of a hand clasping about said terminal weight longitudinal axis and thereby adapted to operatively permit manual rotation of said terminal weight generally cylindrical body about said terminal weight longitudinal axis, said terminal weight longitudinally terminated with a second threaded coupler adapted to operatively couple with said first threaded coupler while aligning said terminal weight longitudinal axis co-axially with said boom longitudinal axis;
   at least one medial weight having a generally cylindrical body defining a longitudinal axis, said at least one medial weight shaped to be adequately grasped by a person's palm and finger portion of a hand clasping about said medial weight longitudinal axis and thereby adapted to operatively permit manual rotation of said medial weight generally cylindrical body about said medial weight longitudinal axis, said at least one medial weight longitudinally terminated with a third threaded coupler adapted to operatively couple with said first coupler while aligning said medial weight longitudinal axis co-axially with said boom longitudinal axis, said at least one medial weight further longitudinally terminated distally from said third threaded coupler with a fourth threaded coupler adapted to operatively couple with said second threaded coupler while aligning said medial weight longitudinal axis co-axially with said terminal weight longitudinal axis; and
   an elastomeric material configured to be operatively compressed between said fourth threaded coupler and said second threaded coupler;
   wherein said at least one medial weight further comprises a shoulder adjacent to said fourth threaded coupler and said terminal weight further comprises a facing surface adjacent to said terminal weight second threaded coupler, said shoulder and said facing surface frictionally engaged to resist differential rotation about said co-axially aligned medial weight longitudinal axis and terminal weight longitudinal axis; wherein said at least one medial weight further comprises a first annular depression in said shoulder
   wherein said at least one terminal weight further comprises a second annular depression configured to be axially aligned with the first annular depression forming a gap to receive said elastomeric material when said fourth threaded coupler is operatively coupled to said second threaded coupler.

2. The combination boom stand and an electroacoustic device of claim 1, wherein said first and fourth threaded couplers comprise male threading, and said second and third threaded couplers comprise female threading, said third threaded coupler coupled to said first threaded coupler and said fourth threaded coupler coupled to said second threaded coupler.

3. The combination boom stand and an electroacoustic device of claim 1, wherein said first and fourth threaded couplers comprise female threading, and said second and third threaded couplers comprise male threading, said third threaded coupler coupled to said first threaded coupler and said fourth threaded coupler coupled to said second threaded coupler.

4. A boom stand adapted to operatively support an electroacoustic device therefrom, comprising:
   a boom defining a longitudinal axis and terminated adjacent a first longitudinal end with a device coupler and at a second end with a first threaded coupler;
   a stand elevating said boom;
   a terminal weight having a cylindrical body defining a longitudinal axis terminated with a second threaded coupler adapted to operatively couple with said first threaded coupler while aligning said terminal weight longitudinal axis co-axially with said boom longitudinal axis;
   at least one medial weight having a generally cylindrical body defining a longitudinal axis terminated with a third threaded coupler adapted to operatively couple with said first coupler while aligning said medial weight longitudinal axis co-axially with said boom longitudinal axis, said at least one medial weight further longitudinally terminated distally from said third threaded coupler with a fourth threaded coupler adapted to operatively couple with said second threaded coupler while aligning said medial weight longitudinal axis co-axially with said terminal weight longitudinal axis; and
   an elastomeric material configured to be operatively compressed between said fourth threaded coupler and said second threaded coupler;
   wherein said at least one medial weight further comprises a shoulder adjacent to said fourth threaded coupler and said terminal weight further comprises a facing surface adjacent to said terminal weight second threaded coupler, said shoulder and said facing surface frictionally engaged to resist differential rotation about said co-axially aligned medial weight longitudinal axis and terminal weight longitudinal axis;
   wherein said at least one medial weight further comprises a first annular depression in said shoulder;
   wherein said at least one terminal weight further comprises a second annular depression configured to be axially aligned with the first annular depression forming a gap to receive said elastomeric material when said fourth threaded coupler is operatively coupled to said second threaded coupler.

5. The boom stand adapted to operatively support an electroacoustic device of claim 4, wherein said first and fourth threaded couplers comprise male threading, and said second and third threaded couplers comprise female threading, said third threaded coupler coupled to said first threaded coupler and said fourth threaded coupler coupled to said second threaded coupler.

6. The boom stand adapted to operatively support an electroacoustic device of claim 4, wherein said first and fourth threaded couplers comprise female threading, and said second and third threaded couplers comprise male threading, said third threaded coupler coupled to said first threaded coupler and said fourth threaded coupler coupled to said second threaded coupler.

* * * * *